United States Patent
Kansara

(10) Patent No.: US 10,573,039 B2
(45) Date of Patent: Feb. 25, 2020

(54) TECHNIQUES FOR INCORPORATING A TEXT-CONTAINING IMAGE INTO A DIGITAL IMAGE

(71) Applicant: NETFLIX, INC., Los Gatos, CA (US)

(72) Inventor: Apurvakumar Dilipkumar Kansara, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 64 days.

(21) Appl. No.: 15/284,285

(22) Filed: Oct. 3, 2016

(65) Prior Publication Data

US 2018/0096502 A1  Apr. 5, 2018

(51) Int. Cl.
*G06T 11/60* (2006.01)
*G06Q 30/02* (2012.01)

(52) U.S. Cl.
CPC ......... *G06T 11/60* (2013.01); *G06Q 30/0276* (2013.01)

(58) Field of Classification Search
None
See application file for complete search history.

(56) References Cited

U.S. PATENT DOCUMENTS

| | | | |
|---|---|---|---|
| 2008/0150964 A1* | 6/2008 | Cho | |
| 2010/0259684 A1* | 10/2010 | Kambe | H04N 5/44504 348/598 |
| 2013/0314441 A1 | 11/2013 | Grasset et al. | |
| 2014/0198127 A1 | 7/2014 | Ying | |
| 2014/0281847 A1* | 9/2014 | Marra | G06F 17/212 715/202 |
| 2014/0359656 A1* | 12/2014 | Banica | |
| 2015/0261803 A1* | 9/2015 | Song | G06K 9/4671 707/797 |
| 2017/0032553 A1* | 2/2017 | O'Donovan | G06N 7/005 |

FOREIGN PATENT DOCUMENTS

EP  1085464 A2  3/2001

OTHER PUBLICATIONS

International Search Report and Written Opinion for International Application No. PCT/US2017/054792 dated Jan. 12, 2018, 15 pages.

Anil K. Jain et al., "Automatic Text Location in Images and Video Frames", Pattern Recognition, vol. 31, No. 12, Dec. 1, 1998, pp. 2055-2076, http://www.sciencedirect.com/science/article/pii/S0031320398000673.

Gautam Malu et al., "An Approach to Optimal Text Placement on Images", Network and Parallel Computing [Lecture Notes in Computer Science; Lect. Notes Computer], Springer International Publishing, Cham, Jul. 21, 2013, pp. 68-74.

* cited by examiner

*Primary Examiner* — Justin P. Misleh
(74) *Attorney, Agent, or Firm* — Artegis Law Group, LLP

(57) ABSTRACT

One embodiment of the present invention sets forth a technique for incorporating a text-containing image into a digital. The technique includes analyzing a digital image to determine one or more text-allowed regions included in the digital image, and, for each of the one or more text-allowed regions, computing a numeric value based on a color contrast between pixels of a text-containing image and pixels of the text-allowed region, wherein the text-containing image is to be incorporated into one of the text-allowed regions included in the digital image. The technique further includes selecting a first text-allowed region based at least in part on the numeric value computed for each text-allowed region, and incorporating the text-containing image into the first text-allowed region included in the digital image.

24 Claims, 11 Drawing Sheets

TECHNIQUES FOR INCORPORATING A TEXT-CONTAINING IMAGE INTO A DIGITAL IMAGE

BACKGROUND OF THE INVENTION

Field of the Invention

The present invention relates generally to computer science and, more specifically, to techniques for incorporating a text-containing image into a digital image.

Description of the Related Art

In advertisements, product packaging, and other promotional materials, text is frequently incorporated into a base image, for example of a product, movie, television show, and the like. Due to the large number of variables that can affect text placement and the importance of not obscuring visually interesting portions of the base image, placement of text in such promotional materials is typically a manual process. That is, a user reviews the base image and decides the final location of text in the promotional image.

However, implementing manual processes for text placement when generating promotional material targeted for local markets, where the written content is translated to a specific local language or dialect, has substantial drawbacks. In particular, such manual processes are considerably inefficient and slow and, therefore, are not scalable. For example, generating localized promotional images for a movie or television show involves manually placing a localized title treatment within a base image, which is a labor-intensive activity. Specifically, for each localized instance of the promotional image, a different title treatment of a different size and/or shape has to be incorporated into a base image without obscuring visually interesting subject matter and without overlapping any of the portions of the base image reserved for other text, logos, etc. Furthermore, each localized instance of the promotional material has to be carefully reviewed to ensure that the title treatment is visible in the selected location and does not suffer from too little contrast with the surrounding portions of the base image. Thus, when promotional materials are to be localized for a large number of languages, dialects, and/or countries, timely generation of those localized materials with acceptable levels of quality can become impracticable.

As the foregoing illustrates, what would be useful are more effective approaches for incorporating text-containing images into digital base images.

SUMMARY OF THE INVENTION

One embodiment of the present invention sets forth a technique for incorporating a text-containing image into a digital. The technique includes analyzing a digital image to determine one or more text-allowed regions included in the digital image, and, for each of the one or more text-allowed regions, computing a numeric value based on a color contrast between pixels of a text-containing image and pixels of the text-allowed region, wherein the text-containing image is to be incorporated into one of the text-allowed regions included in the digital image. The technique further includes selecting a first text-allowed region based at least in part on the numeric value computed for each text-allowed region, and incorporating the text-containing image into the first text-allowed region included in the digital image.

At least one advantage of the disclosed techniques is that a text-containing image can be incorporated into digital image in a way that is more robust and reliable than when performed as a manual process.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the embodiments of the present invention. However, it will be apparent to one of skill in the art that the embodiments of the present invention may be practiced without one or more of these specific details.

System Overview

Figure 1:
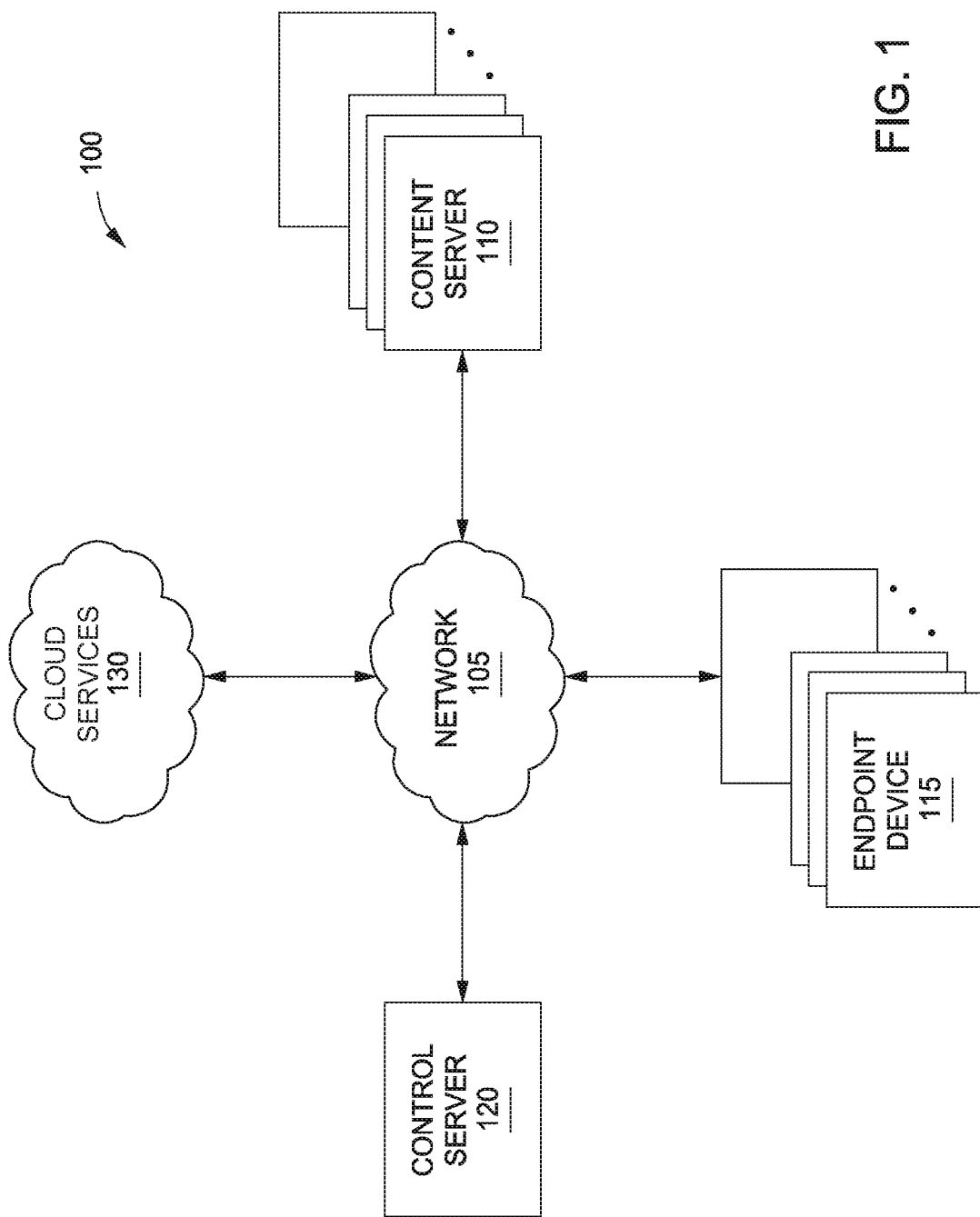
FIG. 1 illustrates a network infrastructure used to distribute content to content servers and endpoint devices, according to various embodiments of the present invention.

FIG. 1 illustrates a network infrastructure 100 used to distribute content to content servers 110 and endpoint devices 115, according to various embodiments of the invention. As shown, the network infrastructure 100 includes content servers 110, control server 120, and endpoint devices 115, each of which are connected via a communications network 105.

Each endpoint device 115 communicates with one or more content servers 110 (also referred to as "caches" or "nodes") via the network 105 to download content, such as textual data, graphical data, audio data, video data, and other types of data. The downloadable content, also referred to herein as a "file," is then presented to a user of one or more endpoint devices 115. In various embodiments, the endpoint devices 115 may include computer systems, set top boxes, mobile computer, smartphones, tablets, console and handheld video game systems, digital video recorders (DVRs), DVD players, connected digital TVs, dedicated media streaming devices, (e.g., the Roku® set-top box), and/or any other technically feasible computing platform that has network connectivity and is capable of presenting content, such as text, images, video, and/or audio content, to a user.

Each content server 110 may include a web-server, database, and server application 217 configured to communicate with the control server 120 to determine the location and availability of various files that are tracked and managed by the control server 120. Each content server 110 may further communicate with cloud services 130 and one or more other content servers 110 in order "fill" each content server 110 with copies of various files. In addition, content servers 110 may respond to requests for files received from endpoint devices 115. The files may then be distributed from the content server 110 or via a broader content distribution network. In some embodiments, the content servers 110 enable users to authenticate (e.g., using a username and password) in order to access files stored on the content servers 110. Although only a single control server 120 is shown in FIG. 1, in various embodiments multiple control servers 120 may be implemented to track and manage files.

In various embodiments, the cloud services 130 may include an online storage service (e.g., Amazon® Simple Storage Service, Google® Cloud Storage, etc.) in which a catalog of files, including thousands or millions of files, is stored and accessed in order to fill the content servers 110. Cloud services 130 also may provide compute or other processing services. Although only a single cloud services 130 is shown in FIG. 1, in various embodiments multiple cloud services 130 may be implemented.

Figure 2:
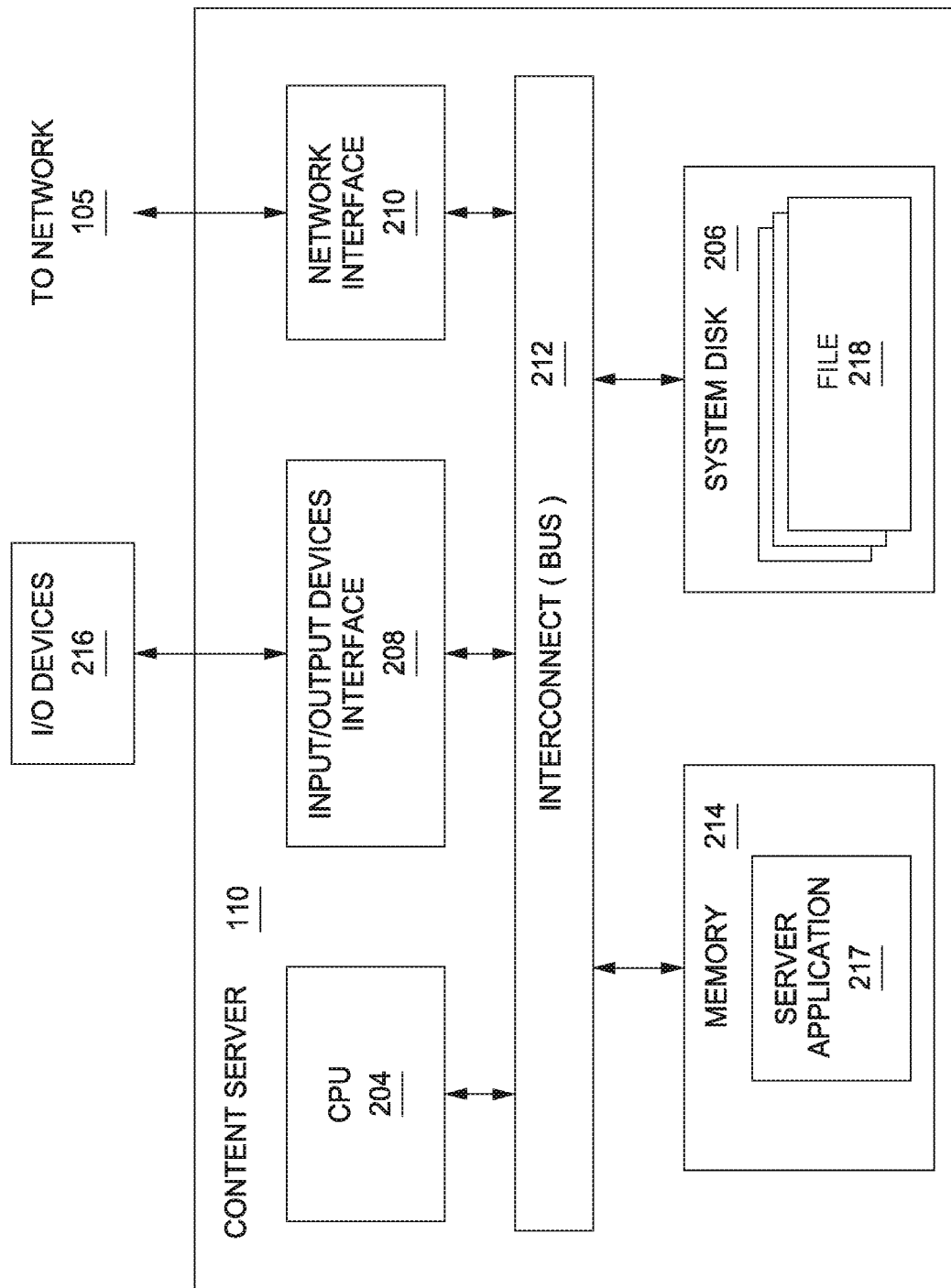
FIG. 2 is a block diagram of a content server that may be implemented in conjunction with the network infrastructure of FIG. 1, according to various embodiments of the present invention.

FIG. 2 is a block diagram of a content server 110 that may be implemented in conjunction with the network infrastructure 100 of FIG. 1, according to various embodiments of the present invention. As shown, the content server 110 includes, without limitation, a central processing unit (CPU) 204, a system disk 206, an input/output (I/O) devices interface 208, a network interface 210, an interconnect 212, and a system memory 214.

The CPU 204 is configured to retrieve and execute programming instructions, such as server application 217, stored in the system memory 214. Similarly, the CPU 204 is configured to store application data (e.g., software libraries) and retrieve application data from the system memory 214. The interconnect 212 is configured to facilitate transmission of data, such as programming instructions and application data, between the CPU 204, the system disk 206, I/O devices interface 208, the network interface 210, and the system memory 214. The I/O devices interface 208 is configured to receive input data from I/O devices 216 and transmit the input data to the CPU 204 via the interconnect 212. For example, I/O devices 216 may include one or more buttons, a keyboard, a mouse, and/or other input devices. The I/O devices interface 208 is further configured to receive output data from the CPU 204 via the interconnect 212 and transmit the output data to the I/O devices 216.

The system disk 206 may include one or more hard disk drives, solid state storage devices, or similar storage devices. The system disk 206 is configured to store non-volatile data such as files 218 (e.g., audio files, video files, subtitles, application files, software libraries, etc.). The files 218 can then be retrieved by one or more endpoint devices 115 via the network 105. In some embodiments, the network interface 210 is configured to operate in compliance with the Ethernet standard.

The system memory 214 includes a server application 217 configured to service requests for files 218 received from endpoint device 115 and other content servers 110. When the server application 217 receives a request for a file 218, the server application 217 retrieves the corresponding file 218 from the system disk 206 and transmits the file 218 to an endpoint device 115 or a content server 110 via the network 105.

Files 218 include a plurality of digital visual content items, such as videos and still images. In addition, files 218 may include digital images associated with a particular video, such as one or more localized promotional images. Such localized promotional images may include a title treatment, a "New Episodes" badge, a corporate or production company logo, and other visual, textual, or symbolic information in addition to the base image. For each instance of promotional image, the title treatment, logo, and other textual information is typically localized for a particular language or country. Thus, for a single video included in files 218, there may be a plurality of localized promotional images. The title treatment, logo, and other textual information are each positioned within a promotional image so that no visually interesting subject matter or other textual information is obscured. In alternative embodiments, such localized promotional images may instead be stored in a control server 120, or in any other technically feasible location.

Figure 3:
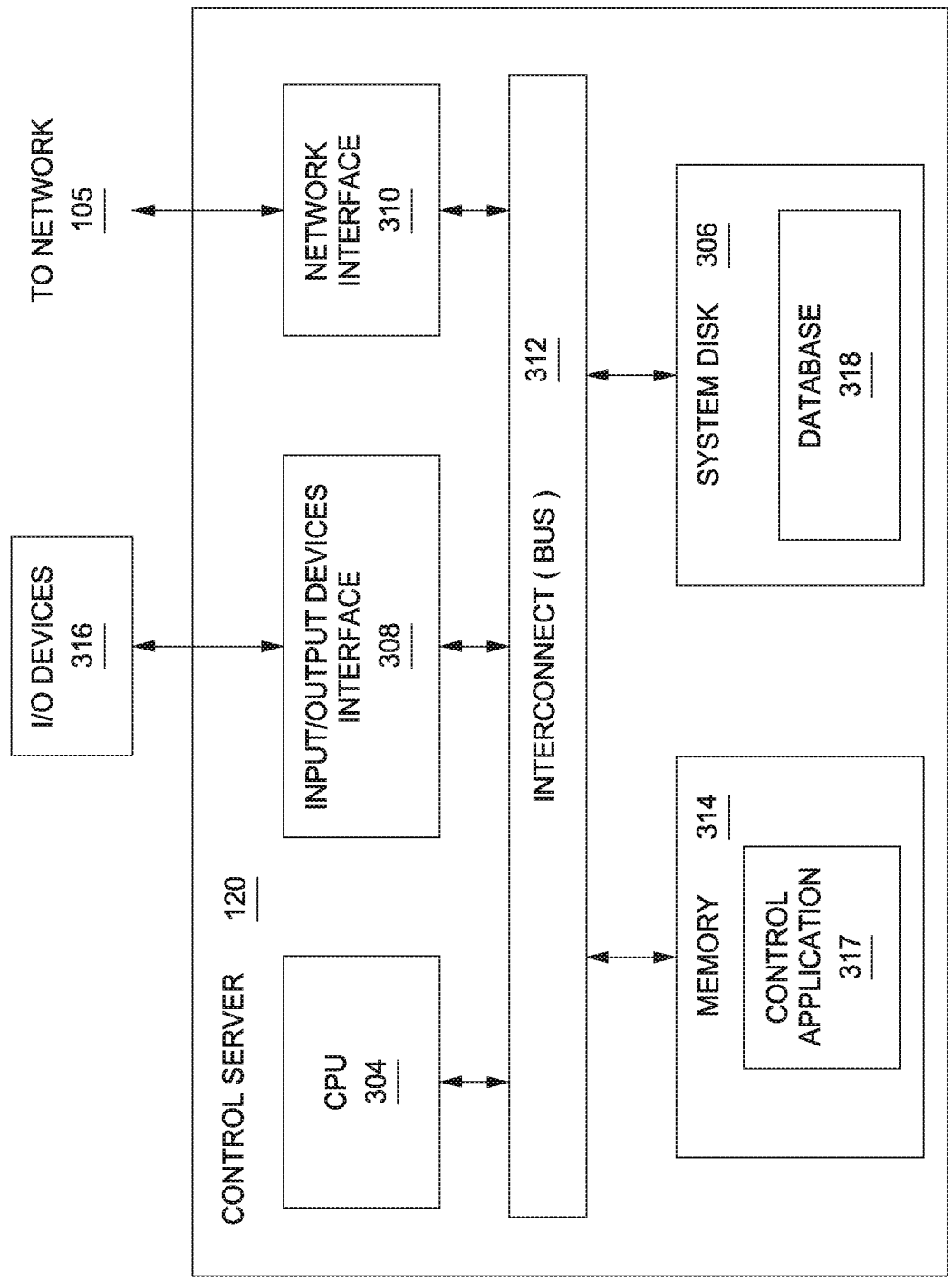
FIG. 3 is a block diagram of a control server that may be implemented in conjunction with the network infrastructure of FIG. 1, according to various embodiments of the present invention.

FIG. 3 is a block diagram of a control server 120 that may be implemented in conjunction with the network infrastructure 100 of FIG. 1, according to various embodiments of the present invention. As shown, the control server 120 includes, without limitation, a central processing unit (CPU) 304, a system disk 306, an input/output (I/O) devices interface 308, a network interface 310, an interconnect 312, and a system memory 314.

The CPU 304 is configured to retrieve and execute programming instructions, such as control application 317, stored in the system memory 314. Similarly, the CPU 304 is configured to store application data (e.g., software libraries) and retrieve application data from the system memory 314 and a database 318 stored in the system disk 306. The interconnect 312 is configured to facilitate transmission of data between the CPU 304, the system disk 306, I/O devices interface 308, the network interface 310, and the system memory 314. The I/O devices interface 308 is configured to transmit input data and output data between the I/O devices 316 and the CPU 304 via the interconnect 312. The system disk 306 may include one or more hard disk drives, solid state storage devices, and the like. The system disk 206 is configured to store a database 318 of information associated with the content servers 110, the cloud services 130, and the files 218.

The system memory 314 includes a control application 317 configured to access information stored in the database 318 and process the information to determine the manner in which specific files 218 will be replicated across content servers 110 included in the network infrastructure 100. The control application 317 may further be configured to receive and analyze performance characteristics associated with one or more of the content servers 110 and/or endpoint devices 115. As noted above, in some embodiments, localized promotional images associated with digital visual content items may be stored in database 318 rather than in files 218 stored in content servers 110.

Figure 4:
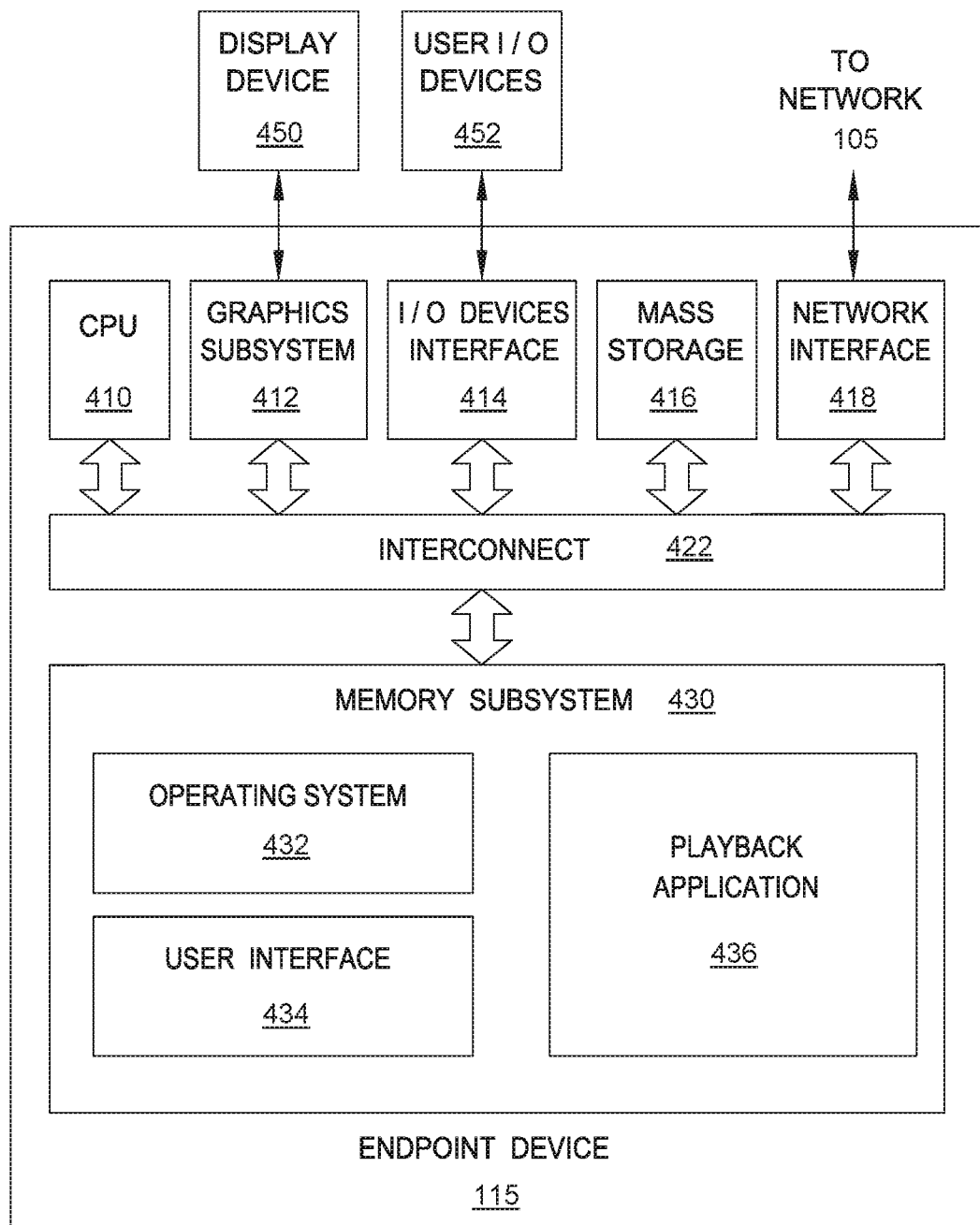
FIG. 4 is a block diagram of an endpoint device that may be implemented in conjunction with the network infrastructure of FIG. 1, according to various embodiments of the present invention.

FIG. 4 is a block diagram of an endpoint device 115 that may be implemented in conjunction with the network infrastructure 100 of FIG. 1, according to various embodiments of the present invention. As shown, the endpoint device 115 may include, without limitation, a CPU 410, a graphics subsystem 412, an I/O device interface 414, a mass storage unit 416, a network interface 418, an interconnect 422, and a memory subsystem 430.

In some embodiments, the CPU 410 is configured to retrieve and execute programming instructions stored in the memory subsystem 430. Similarly, the CPU 410 is configured to store and retrieve application data (e.g., software libraries) residing in the memory subsystem 430. The interconnect 422 is configured to facilitate transmission of data, such as programming instructions and application data, between the CPU 410, graphics subsystem 412, I/O devices interface 414, mass storage 416, network interface 418, and memory subsystem 430.

In some embodiments, the graphics subsystem 412 is configured to generate frames of video data and transmit the frames of video data to display device 450. In some embodiments, the graphics subsystem 412 may be integrated into an integrated circuit, along with the CPU 410. The display device 450 may comprise any technically feasible means for generating an image for display. For example, the display device 450 may be fabricated using liquid crystal display (LCD) technology, cathode-ray technology, and light-emitting diode (LED) display technology. An input/output (I/O) device interface 414 is configured to receive input data from user I/O devices 452 and transmit the input data to the CPU 410 via the interconnect 422. For example, user I/O devices 452 may comprise one of more buttons, a keyboard, and a mouse or other pointing device. The I/O device interface 414 also includes an audio output unit configured to generate an electrical audio output signal. User I/O devices 452 includes a speaker configured to generate an acoustic output in response to the electrical audio output signal. In alternative embodiments, the display device 450 may include the speaker. Examples of suitable devices known in the art that can display video frames and generate an acoustic output include televisions, smartphones, smartwatches, electronic tablets, and the like.

A mass storage unit 416, such as a hard disk drive or flash memory storage drive, is configured to store non-volatile data. A network interface 418 is configured to transmit and receive packets of data via the network 105. In some embodiments, the network interface 418 is configured to communicate using the well-known Ethernet standard. The network interface 418 is coupled to the CPU 410 via the interconnect 422.

In some embodiments, the memory subsystem 430 includes programming instructions and application data that comprise an operating system 432, a user interface 434, and a playback application 436. The operating system 432 performs system management functions such as managing hardware devices including the network interface 418, mass storage unit 416, I/O device interface 414, and graphics subsystem 412. The operating system 432 also provides process and memory management models for the user interface 434 and the playback application 436. The user interface 434, such as a window and object metaphor, provides a mechanism for user interaction with endpoint device 108. Persons skilled in the art will recognize the various operating systems and user interfaces that are well-known in the art and suitable for incorporation into the endpoint device 108.

In some embodiments, the playback application 436 is configured to request and receive content from the content server 105 via the network interface 418. Further, the playback application 436 is configured to interpret the content and present the content via display device 450 and/or user I/O devices 452. Such content may include a promotional image for a movie or television show, and the promotional image have localized text incorporated therein.

According to various embodiments of the invention, a text-containing image, such as a movie or television show title treatment, is incorporated into a digital image, such as a movie or television show promotional still. More specifically, the text-containing image is located within the digital image so that no visually interesting portions of the digital image are obscured. First, one or more candidate text-allowed regions within the digital image are determined. For each candidate text-allowed region, a numeric value is then determined that quantifies suitability of the candidate text-allowed region as the location for the text-containing image. Finally, the digital image is modified by replacing the most suitable candidate text-allowed region in the digital image with the text-containing image or disposing the text-containing image within the most suitable candidate text-allowed region.

Determination of Candidate Text-Allowed Regions for Text Location

As noted above, in embodiments of the invention, one or more candidate text-allowed regions for locating a text-containing image within a digital image are determined based on various criteria. One such criterion is that the candidate text-allowed region is included within a negative space region of the digital image, and therefore does not include any edge pixels detected via an edge detection operation. Another such criterion is that the candidate text-allowed region does not overlap a proscribed portion of the digital image, such as a visually interesting region of the digital image, or a portion of the digital image reserved for another text-containing image. Negative space regions, edge pixels, visually interesting regions, and reserved portions of a digital image are described below in conjunction with FIGS. 5-9.

Figure 5:
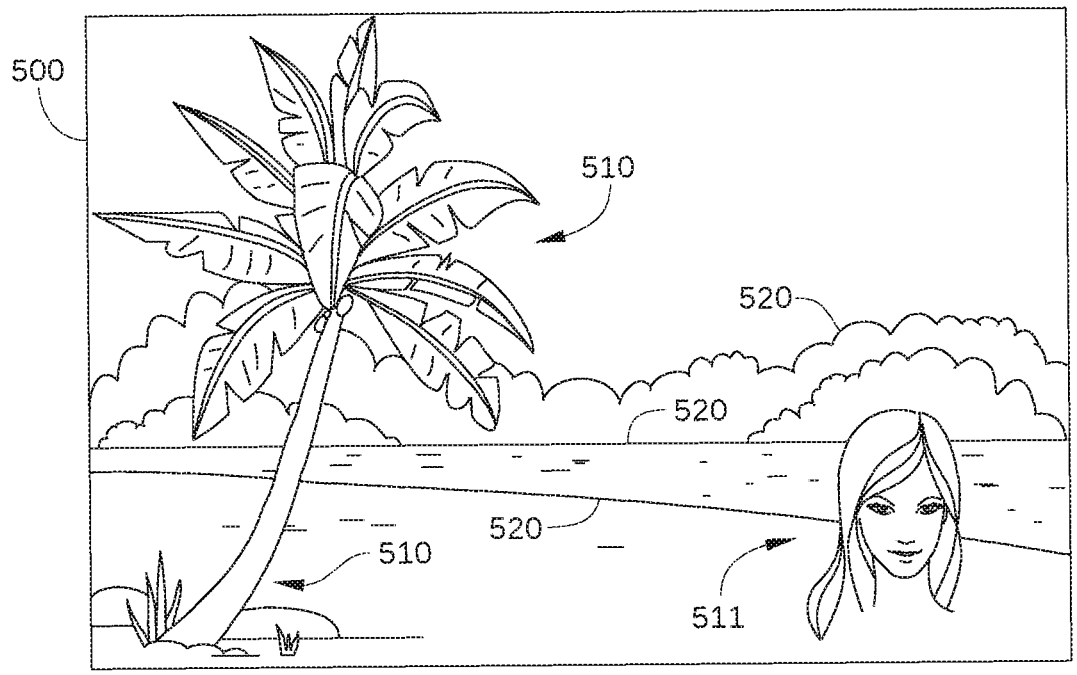
FIG. 5 schematically illustrates a digital image to be modified with a text-containing image, according to various embodiments of the present invention.

FIG. 5 schematically illustrates a digital image 500 to be modified with a text-containing image, according to various embodiments of the present invention. The text-containing image may be a title treatment, a logo, a "New Episodes" badge, and the like. Digital image 500 is a numeric representation of a two-dimensional image, such as a single digital image or photograph, a single frame of a digital video, or a collage of visual subject matter from multiple images or photographs. Digital image 500 may be a rastor or bit-mapped image, among others, and includes a plurality of pixels. In some embodiments, digital image 500 is a base image for promotional material for a movie or television show. Consequently, digital image 500 includes a combination of visually interesting subject matter 510 and visually less significant subject matter 520.

Visually interesting subject matter 510 generally includes subject matter in digital image 500 that is more in focus, and therefore is the visual subject matter in digital image 500 that is intended to attract the attention of a viewer. It is noted that, for visual impact, compositional structure, and other aesthetic reasons, visually interesting subject matter 510 is not necessarily located in a center region of digital image 500. Furthermore, visually interesting subject matter 510 is not necessarily in the foreground of digital image 500. However, because visually interesting subject matter 510 is more in focus than visually less significant subject matter 520, according to various embodiments of the invention, visually interesting subject matter 510 can be detected via a computer-implemented edge detection operation, described below, rather than via manual review.

In some embodiments, visually interesting subject matter 510 may also include any human face 511 or faces included in the subject matter of digital image 500. In such embodiments, any technically feasible face detection algorithm may be employed to detect any human faces 511 that are included in digital image 500. Thus, rather than a time-consuming and labor intensive manual review process, a computer-implemented operation detects human faces 511.

Unlike visually interesting subject matter 510, visually less significant subject matter 520 is generally out of focus or less in focus. However, similar to interesting subject matter 510, visually less significant subject matter 520 is not defined by position within digital image 500, and can be disposed in a center region, side region, top region, or bottom region of digital image 500. Further, visually less significant subject matter 520 may be in the foreground or background of digital image 500.

Figure 6:
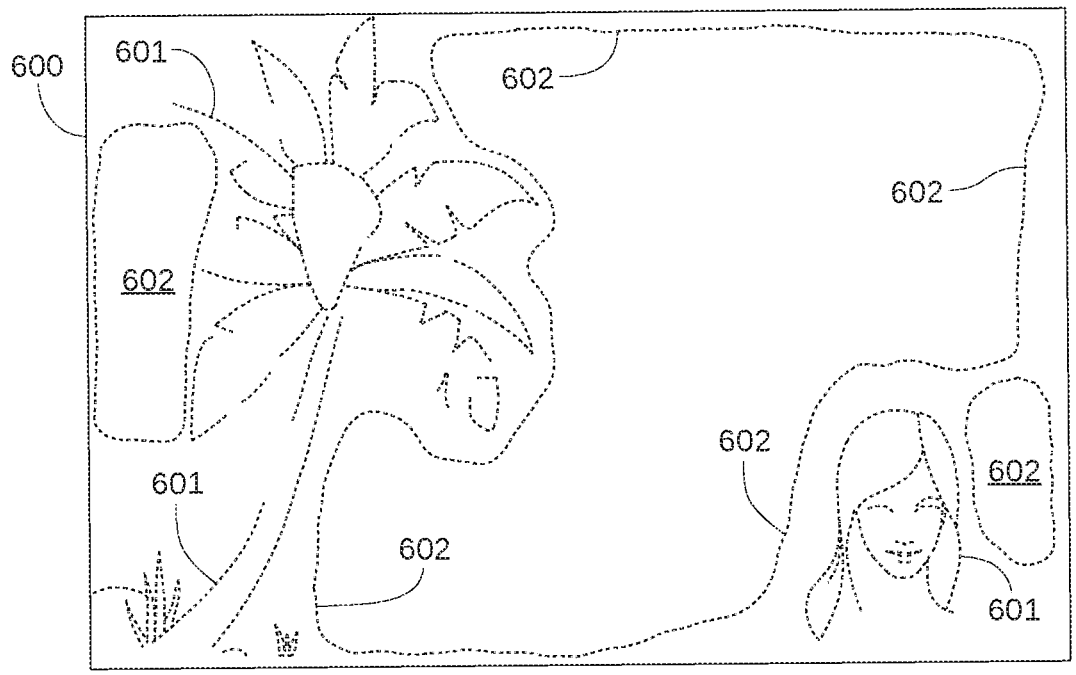
FIG. 6 illustrates an edge diagram associated with the digital image of FIG. 5, according to various embodiments of the present invention.

FIG. 6 illustrates an edge diagram 600 associated with digital image 500, according to various embodiments of the present invention. Edge diagram 600 includes edges 601 and negative space regions 602. Edges 601 include pixels that have been detected in digital image 500 via a conventional edge detection algorithm. Negative space regions 602 are regions within edge diagram 600 that are free of such edge pixels, and therefore correspond to negative space within digital image 500, i.e., the space around and between visually interesting subject matter in digital image 500. Negative space regions 602 correspond to portions of digital image 500 in which a text-containing image can be incorporated without overlapping visually interesting subject matter 510. Thus, edge diagram 600 includes the output of an edge detection algorithm and negative space regions 602 defined by such output.

Edge detection is an image processing technique that determines boundaries of objects within a digital image. Typically, discontinuities in brightness are detected between adjacent pixels of the digital image. Consequently, pixels from the most prominent edges in digital image 500 are included in edge diagram 600, such as edges 601 associated with subject matter that is more sharply focused, i.e., visually interesting subject matter 510. By contrast, pixels from less prominent edges, such as edges associated with subject matter that is not sharply focused, are not included in edge diagram 600. Thus, edge diagram 600 generally does not include edge pixels from the edges of visually less significant subject matter 520.

In one or more embodiments, edge diagram 600 is generated via one or more edge detection operations after a blurring algorithm has been applied to digital image 500. In such embodiments, edges in digital image 500 that are not well-focused are removed, and edge detection operations are performed on a slightly blurred version of digital image 500. Consequently, subject matter that is slightly out of focus, such as visually less significant subject matter 520, will have fewer or no edges 601 in edge diagram 600. For example, in one or more embodiments, Gaussian blurring may be performed on digital image 500. In other embodiments, any other technically feasible blurring algorithm may be employed prior to performing edge detection operations.

Also shown in edge diagram 600 are negative spaces 602. Negative spaces 602 correspond to regions of digital image 500 in which no visually interesting subject matter 510 is located. Alternatively, negative spaces 602 are regions of edge diagram 600 that are free of edges 601.

Figure 7:
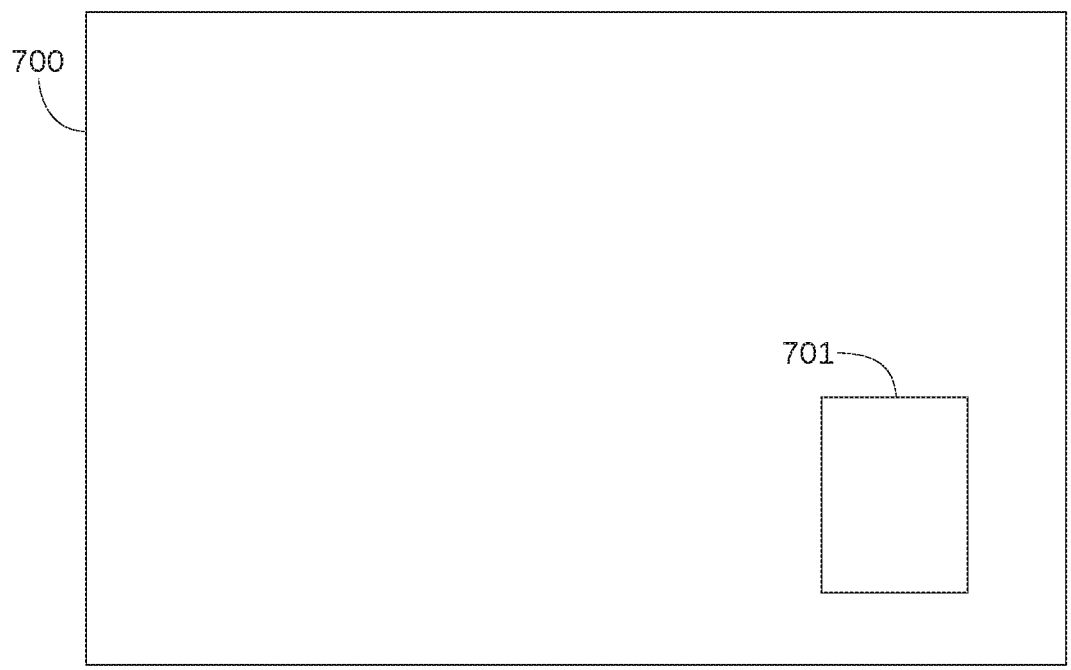
FIG. 7 illustrates a facial recognition diagram associated with the digital image of FIG. 5, according to various embodiments of the present invention.

FIG. 7 illustrates a facial recognition diagram 700 associated with digital image 500, according to various embodiments of the present invention. Facial recognition diagram 700 includes the output of an edge detection algorithm, specifically a bounding shape 701 for each face detected by a facial recognition operation in digital image 500. Generally, a human face, if present, is a point of high visual interest in an image. Therefore, when a text-containing image is incorporated into digital image 500, placement of the text-containing image should not overlap bounding shape 701. Any technically feasible face detection algorithm may be employed to determine whether one or more human faces are visible in digital image 500 and to generate bounding shape 701 accordingly.

Bounding shape 701 indicates a portion of digital image in which a text-containing image should not be incorporated, since the human face 511 (shown in FIG. 5) that corresponds to bounding shape 701 is considered visually interesting subject matter 510, even if not more in focus than visually less significant subject matter 520. In the embodiment illustrated in FIG. 7, bounding shape 701 is depicted as a rectangle. In other embodiments, bounding shape 701 may be any other suitably sized polygon, circle, oval, or other geometric shape. In yet other embodiments, bounding shape 701 may be an outline of a human face detected in digital image 500, such as human face 511.

Figure 8:
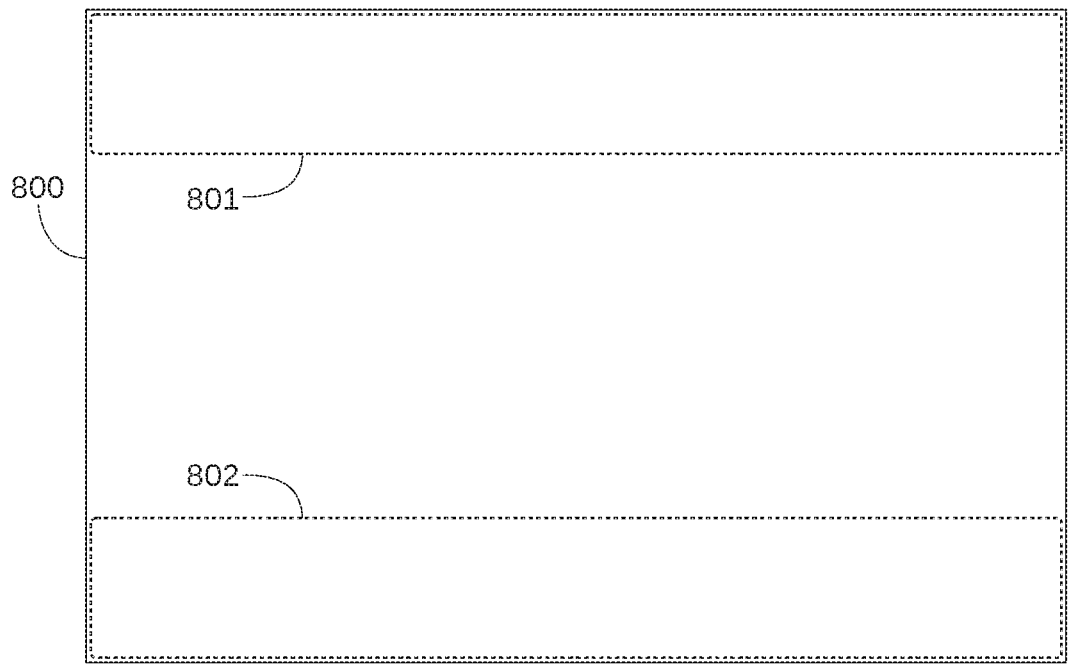
FIG. 8 illustrates a safe zone diagram associated with the digital image of FIG. 5, according to various embodiments of the present invention.

FIG. 8 illustrates a safe zone diagram 800 associated with digital image 500, according to various embodiments of the present invention. Safe zone diagram 800 includes one or more reserved regions 801 and 802 that each indicate a portion of digital image 500 that is reserved for a text-containing image, or other visual information. For example, in some embodiments, digital image 500 is used as a base image for promotional material, such as a promotional image displayed on a website and/or downloaded to an endpoint device 115 in FIG. 1. In such embodiments, reserved region 801 may correspond to a region of digital image 500 in which a corporate or production company logo is displayed, while reserved region 802 may correspond to a region of digital image 500 in which a "New Episodes" badge, an "Award Winning" icon or symbol, or other graphical information is displayed, when applicable. Thus, reserved regions 801 and 802 indicate other regions of digital image 500 in which a title treatment or other text-containing image should not be located. Otherwise, without such "safe zones" in which additional text-containing images may be located, a title treatment may be positioned in digital image 500 so that a logo or informational badge or symbol is partially or completely obscured. As a result, the visual impact of the promotional image and/or the clarity with which the promotional image conveys information to a viewer is reduced.

In some embodiments, the size, shape, and/or location of reserved regions 801 and 802 may vary depending on the country, language, or dialect for which a particular promotional image is localized. For example, in some embodiments, reserved region 802 corresponds to a region of digital image 500 in which a "New Episodes" badge can be displayed. In such embodiments, reserved region 802 may be defined as the lower quarter or lower third of digital image 500 for an instance of the promotional image that is localized for the English language or some other language in which text is typically oriented horizontally. By contrast, for an instance of the promotional image that is localized for Japanese or some other language in which text is typically oriented vertically, reserved region 802 may be defined as the rightmost quarter of digital image 500. In addition, the size of reserved region 802 may vary for each different localization of the "New Episodes" badge.

Figure 9:
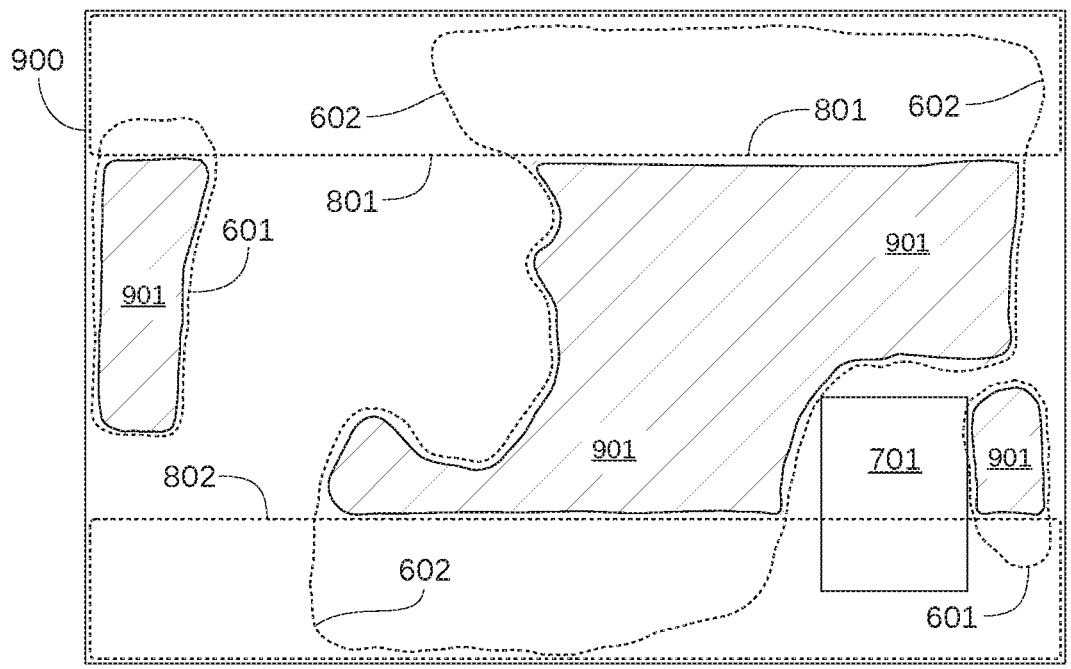
FIG. 9 illustrates a text-eligible regions diagram associated with the digital image of FIG. 5, according to various embodiments of the present invention.

FIG. 9 illustrates a text-eligible regions diagram 900 associated with digital image 500, according to various embodiments of the present invention. Text-eligible regions diagram 900 shows the portions of digital image 500 in which a title treatment or other text-containing image can be incorporated into or superimposed onto digital image 500. Specifically, text eligible regions diagram 900 shows the available negative space regions 901 of digital image 500, i.e., the regions of digital image 500 that do not overlap or obscure visually interesting subject matter 510, a bounding shape 701 for a human face detected in digital image 500, or reserved regions 801 or 802.

As shown, available negative space regions 901 are not necessarily congruent with negative spaces 602. For example, when one or more reserved regions 801 and 802 are associated with digital image 500, the portions of negative spaces 602 that overlap reserved region 801 or 802 are not included in available negative space regions 901, since reserved region 801 or 802 are portions of digital image 500 in which the placement of a text-containing image or other supplemental visual information is proscribed.

According to various embodiments of the invention, a title treatment or other text-containing image is located within an available negative space region 901. Thus, the text-containing image is incorporated into or superimposed onto digital image 500 in such a way that no visually interesting subject matter 510, human faces 511, or reserved regions 801 or 802 are overlapped or obscured. Such embodiments may be implemented as one or more applications executed by one or more computing devices. For example, a text-locating application may be employed to locate a text-containing image within a digital image, text may be detected in a text-containing image by executing a text detection application, text-allowed regions may be determined by executing a text-allowed region application, edge detection in a digital image may be performed by executing an edge detection application, blurring operations on a digital image may be performed by executing an image blurring application, contrast analysis between a text-containing image and a text-allowed region in a digital image may be performed by executing a contrast analysis application, and face detection in a digital image may be performed by executing a face detection application. Such applications may be executed on content server 110 in FIG. 1, control server 120 in FIG. 2, and/or on a stand-alone computing device. One such computing device is described below in conjunction with FIG. 10.

Figure 10:
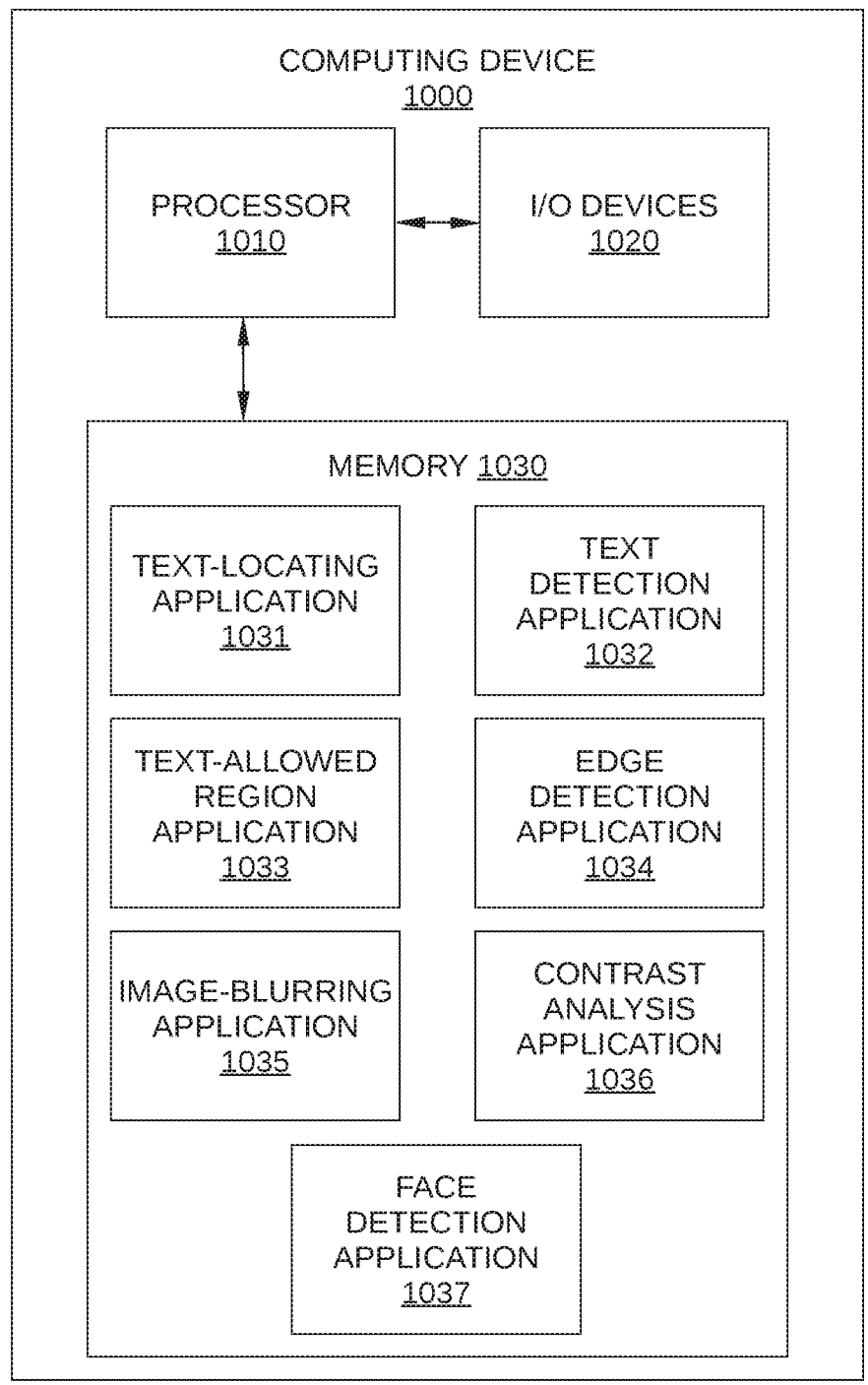
FIG. 10 is an illustration of a computing device configured to implement various embodiments of the invention.

FIG. 10 is an illustration of a computing device 1000 configured to implement various embodiments of the invention. In operation, computing device 1000 is configured to determine a suitable location within a digital image for a text-containing image by executing one or more of a text-locating application 1031, a text detection application 1032, a text-allowed region application 1033, an edge detection application 1034, an image blurring application 1035, a contrast analysis application 1036, and/or a face detection application 1037, according to one or more embodiments of the present invention. In some embodiments, text-locating application 1031 may include the functionality of any combination of text detection application 1032, text-allowed region application 1033, edge detection application 1034, image blurring application 1035, contrast analysis application 1036, and/or face detection application 1037.

Computing device 1000 may be any type of device capable of executing application programs including, without limitation, instructions associated with text-locating application 1031, text detection application 1032, text-allowed region application 1033, edge detection application 1034, image blurring application 1035, contrast analysis application 1036, and/or face detection application 1037. Text-locating application 1031, text detection application 1032, text-allowed region application 1033, edge detection application 1034, image blurring application 1035, contrast analysis application 1036, and face detection application 1037 are described below in conjunction with FIGS. 11 and 12. For example, and without limitation, computing device 1000 may be a laptop, a tablet, a smartphone, etc. In the embodiment illustrated in FIG. 10, computing device 1000 includes, without limitation, a processor 1010, input/output (I/O) devices 1020, and a memory 1030.

Processor 1010 may be implemented as a central processing unit (CPU), a graphics processing unit (GPU), an ASIC, an FPGA, any other type of processing unit, or a combination of different processing units. Among other things, and without limitation, processor 1010 may be any technically feasible hardware unit capable of processing data and/or executing software applications to facilitate execution of text-locating application 1031, text detection application 1032, text-allowed region application 1033, edge detection application 1034, image blurring application 1035, contrast analysis application 1036, and/or face detection application 1037, as described herein.

I/O devices 1020 may include input devices, output devices, and devices capable of both receiving input (e.g., digital images and text-containing images to be incorporated into the digital images) and providing output (e.g., digital images in which one or more text-containing images have been incorporated). Memory 1030 may include a memory module or a collection of memory modules. As shown, in some embodiments, some or all of text-locating application 1031, text detection application 1032, text-allowed region application 1033, edge detection application 1034, image blurring application 1035, contrast analysis application 1036, and/or face detection application 1037 may reside in memory 1030 during operation.

Computing device 1000 may be implemented as a stand-alone chip, such as a microprocessor, or as part of a more comprehensive solution that is implemented as an application-specific integrated circuit (ASIC), a system-on-a-chip (SoC), and so forth. Generally, computing device 1000 may be configured to coordinate the overall operation of a computer-based system. In other embodiments, computing device 1000 may be coupled to, but separate from such a computer-based system. In such embodiments, the computer-based system may include a separate processor that transmits input to computing device 1000, such as digital images and text-containing images to be incorporated into the digital images, and receives output from computing device 1000, such as digital images in which one or more text-containing images have been incorporated. However, the embodiments disclosed herein contemplate any technically feasible system configured to implement text-locating application 1031, text detection application 1032, text-allowed region application 1033, edge detection application 1034, image blurring application 1035, contrast analysis application 1036, and/or face detection application 1037, in any combination.

In alternative embodiments, rather than being configured as a stand-alone machine, computing device 1000 may be associated with or included in one or more of content servers 110 and/or control servers 120 in FIG. 1. For example, and without limitation, the functionality of computing device 1000 may be incorporated into or implemented by the various processors included within content server 110, shown in FIG. 2 and/or any server or other machine within cloud services 130 in FIG. 1. In such embodiments, text-locating application 1031, text detection application 1032, text-allowed region application 1033, edge detection application 1034, image blurring application 1035, contrast analysis application 1036, and/or face detection application 1037 may reside in one or more of content servers 110 and/or control servers 120 during operation.

Figure 11:
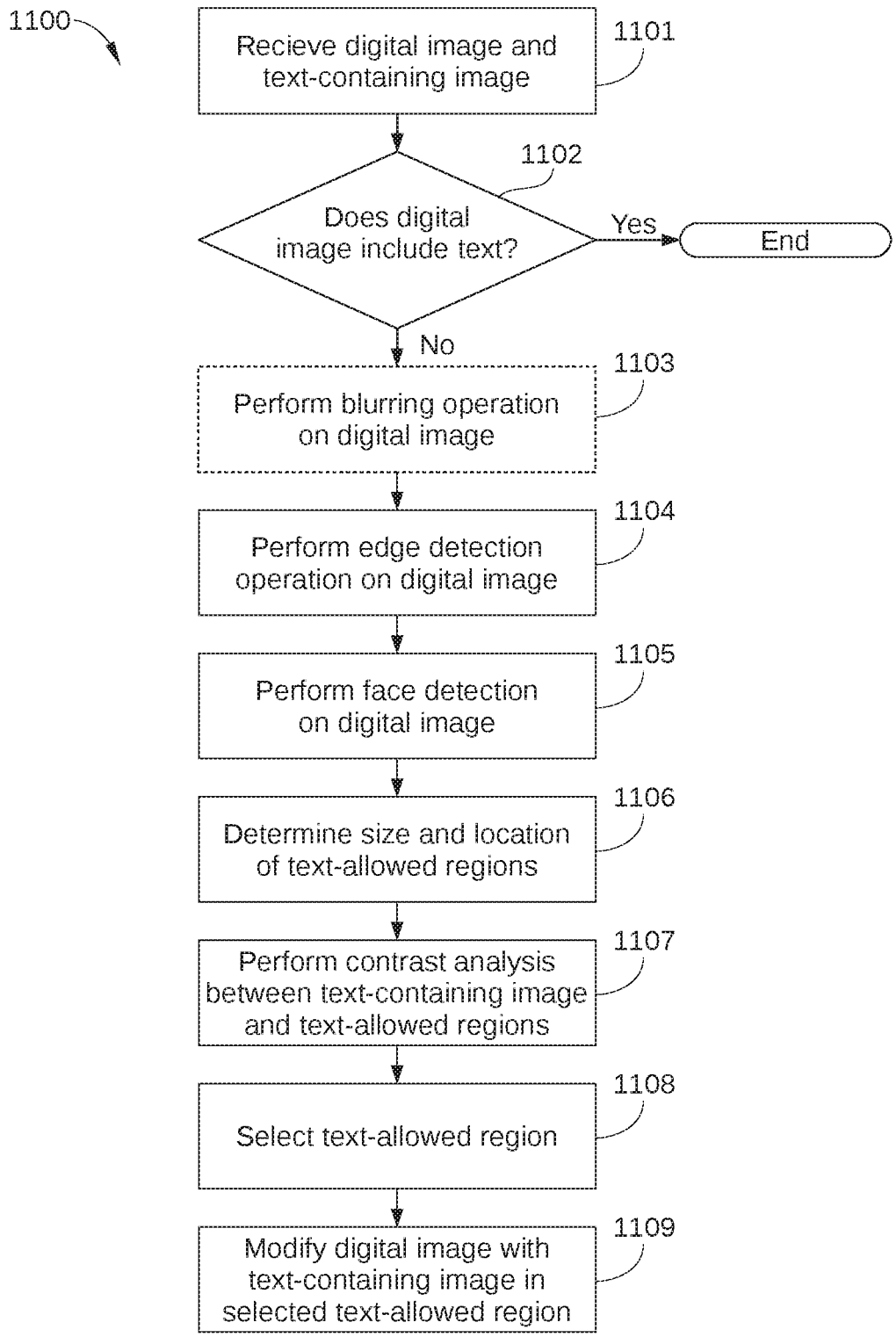
FIG. 11 sets forth a flowchart of method steps for incorporating a text-containing image into a digital image, according to various embodiments of the present invention.

FIG. 11 sets forth a flowchart of method steps for incorporating a text-containing image into a digital image, according to various embodiments of the present invention. Although the method steps are described with respect to the systems of FIGS. 1-10, persons skilled in the art will understand that any system configured to perform the method steps, in any order, falls within the scope of the present disclosure.

As shown, a method 1100 begins at step 1101, in which text-locating application 1031 receives a digital image, such as digital image 500 in FIG. 5, and a text-containing image, such as a title treatment for a movie or TV show.

In step 1102, text-locating application 1031 determines whether the digital image received in step 1101 already includes text. For example, in some situations, a digital image may already have a title treatment incorporated therein, and the application of method 1100 to the digital image is not applicable. Thus, if text is detected in the digital image, the digital image is rejected and method 1100 terminates; if no, method 1100 proceeds to step 1103. In some embodiments, text detection application 1032 may be employed in step 1102 to detect whether the digital image received in step 1101 already includes text. Text detection application 1032 may be any suitable text-detection or text-recognition application known in the art.

In optional step 1103, text-locating application 1031 performs a blurring operation on the digital image received in step 1101. For example, blurring application 1035 may be employed in step 1103. Blurring application 1035 is configured to perform the blurring operation, such as a Gaussian blurring operation, thereby generating a slightly blurred version of the digital image. Thus, edges in the digital image that are not well-focused are removed in the blurred version of the digital image. As a result, high-contrast regions of a digital image that are not in focus are less likely to be detected as edges in a subsequent edge detection operation, thereby reducing or eliminating extraneous edges and/or edges that are associated with objects that are out of focus.

In step 1104, text-locating application 1031 performs one or more edge detection operations on the digital image received in step 1101 or, alternatively, on the blurred version of the digital image generated in step 1103. For example, edge detection application 1034 may be employed in step 1104. Edge detection application 1034 is configured to perform the one or more edge detection operations. Specifically, a pixel in the digital image that has a high color shift from an adjacent pixel is generally considered an edge pixel. Individual edge pixels and/or groups of adjacent or proximate edge pixels generally indicate the location of an in-focus edge in the digital image, such as edges 601 in FIG. 6. Such edges and edge pixels can provide a robust boundary analysis of objects in a digital image that are more in focus and therefore likely considered to be visually interesting subject matter.

In step 1105, text-locating application 1031 detects whether any human faces are included in the digital image received in step 1101. For example, face detection application 1037 may be employed in step 1105. Face detection application 1037 is configured to perform face detection on the digital image. In addition, face detection application 1037 determines the size and location of a bounding shape for each of the one or more human faces detected.

In step 1106, text-locating application 1031 determines a size and location of one or more text-allowed regions in the digital image received in step 1101. For example, text-allowed region application 1033 may be employed in step 1106. Text-allowed region application 1033 is configured to determine regions of the digital image in which the text-containing image can be incorporated without overlapping visually interesting subject matter or other proscribed regions of the digital image. Thus, text-allowed region application 1033 determines available negative space regions in the digital image similar to available negative space regions 901 in FIG. 9.

In some embodiments, the available negative space regions determined in step 1106 correspond to negative space regions of the digital image that include no visually interesting subject matter and no bounding shapes for a human face. In embodiments in which one or more reserved regions are associated with the digital image, the available negative space regions determined in step 1106 correspond to negative space regions that also do not overlap such reserved regions. It is noted that for each localized version of the text-containing image received in step 1101, such reserved regions may have a different size, shape, and location. Thus, the process of manually determining available negative space regions for a digital image for each a plurality of different localizations can be a time-consuming and error-prone process.

After determining the available negative space regions for the digital image, text-allowed region application 1033 determines one or more text-allowed regions for the text-containing image received in step 1101. To prevent any portion of the text-containing image to overlap or otherwise obscure visually interesting subject matter, any bounding shapes for detected human faces, or reserved regions in the digital image, each text-allowed region determined in step 1106 is disposed within the available negative space regions determined in step 1106. Thus, each text-allowed region determined in step 1106 does not overlap a proscribed portion of the digital image. One embodiment of text-allowed regions determined in step 1106 is illustrated in FIG. 12.

Figure 12:
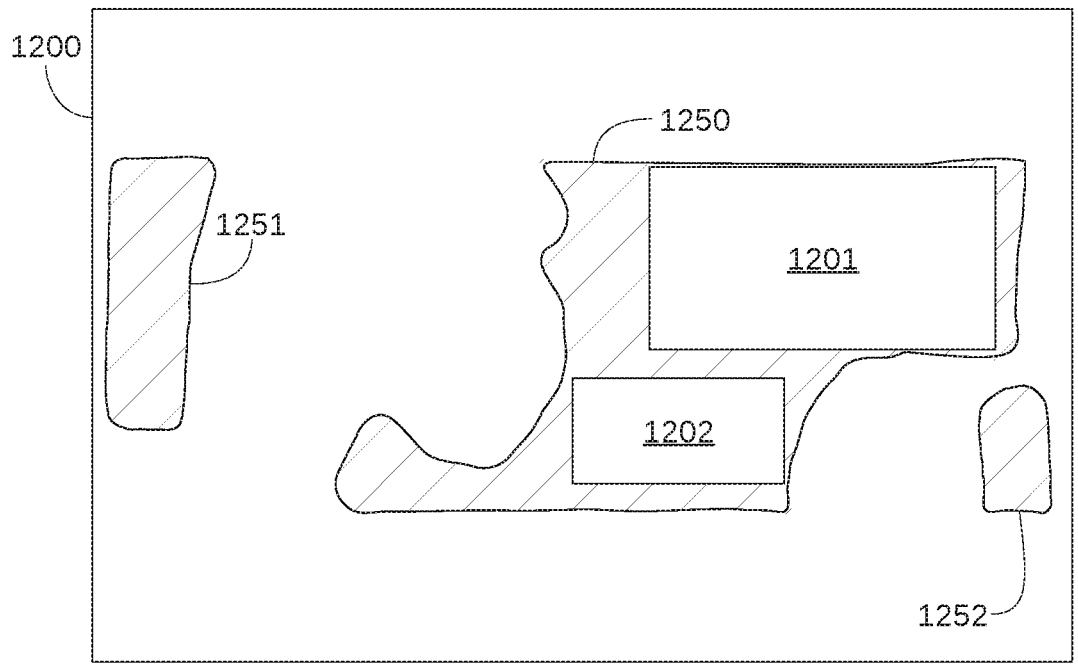
FIG. 12 schematically illustrates text-allowed regions disposed within an available negative space region of a digital image, according to various embodiments of the present invention.

FIG. 12 schematically illustrates text-allowed regions 1201 and 1202 disposed within an available negative space region 1250 of a digital image, according to various embodiments of the present invention. By way of example, available negative space region 1250 is depicted to be substantially similar in size and shape to an available negative space region 901 of digital image 500. As shown, text-allowed regions 1201 and 1202 are each disposed within available negative space region 1250, and therefore do not overlap a proscribed portion of the digital image associated with available negative space region 1250. Further, text-allowed regions 1201 and 1202 each have a same aspect ratio of the text-containing image received in step 1101. For example, in the embodiment illustrated in FIG. 12, text-allowed regions 1201 and 1202 each have an aspect ratio of 2:1.

Because the text-containing image received in step 1101 is scaled to fit within one of text-allowed regions 1201 and 1202, in some embodiments, text-allowed regions 1201 and 1202 are each selected to have an area that is greater than a minimum threshold value. In such embodiments, the selection of a text-allowed region having a size that is too small is prevented, since scaling of the text-containing image down below the minimum threshold size can result in the text of the text-containing image to be difficult or read or unreadable. For example, in some embodiments, the minimum threshold value is 80% of the area (in pixels) of the text-containing image with which text-allowed regions 1201 and 1202 are associated. Consequently, text-allowed region application 1033 cannot size and locate a text-allowed region in unsuitably small available negative space regions such as available negative space regions 1251 and 1252.

The sizes and positions of text-allowed regions 1201 and 1202 within available negative space region 1250 may be selected via any suitable fitting algorithm. In some embodiments, a largest possible text-allowed region is determined within available negative space region (or regions) 1250. Then, in the remainder portion of the available negative space region (or regions) 1250, a largest possible text-allowed region is again selected, and so on, until no additional text-allowed region larger than the minimum threshold size can be selected.

In the embodiment illustrated in FIG. 12, text-allowed regions 1201 and 1202 are rectangular in shape. In other embodiments, text-allowed regions 1201 and 1202 may have any other suitable shape, as illustrated in FIGS. 13A-13D. FIGS. 13A-13D illustrate different text-allowed region for a digital image, according to various embodiments of the present invention.

Figure 13A:
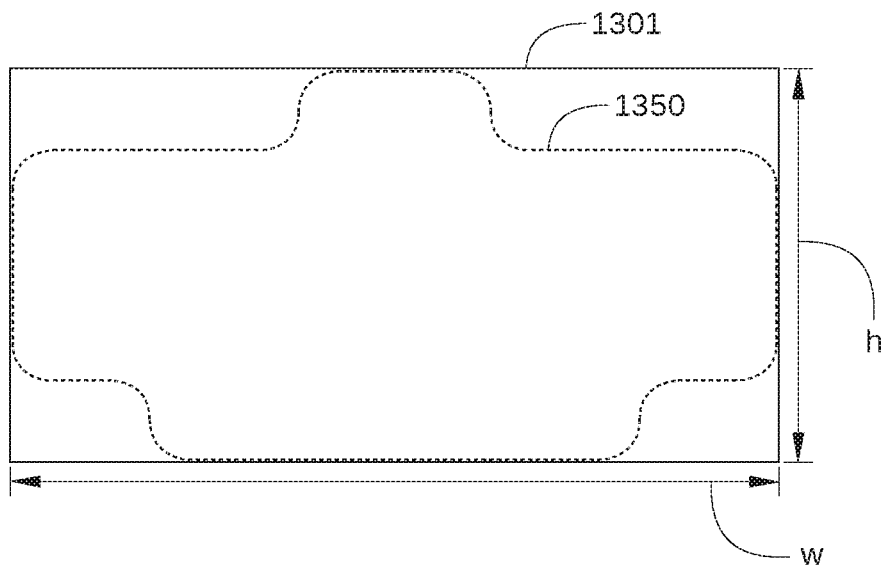
FIGS. 13A-13D illustrate different text-allowed region for a digital image, according to various embodiments of the present invention.
Figure 13B:
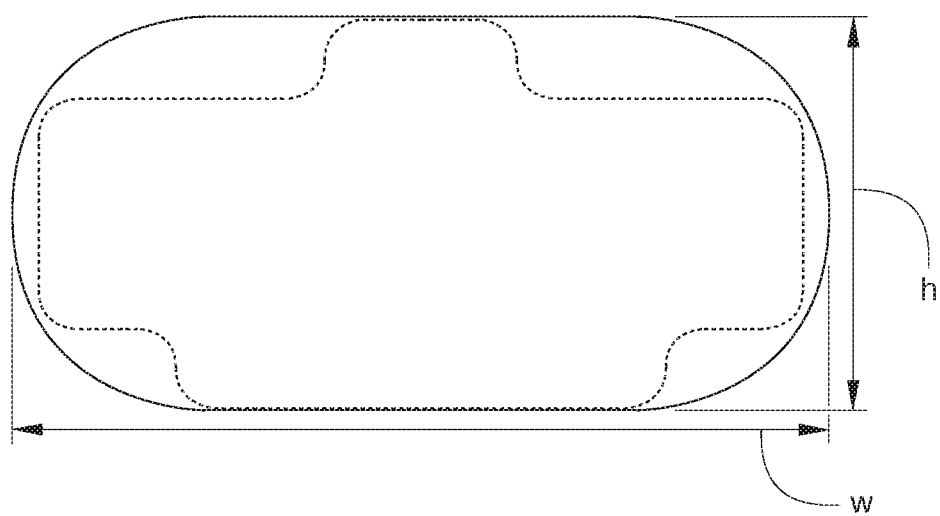
Figure 13C:
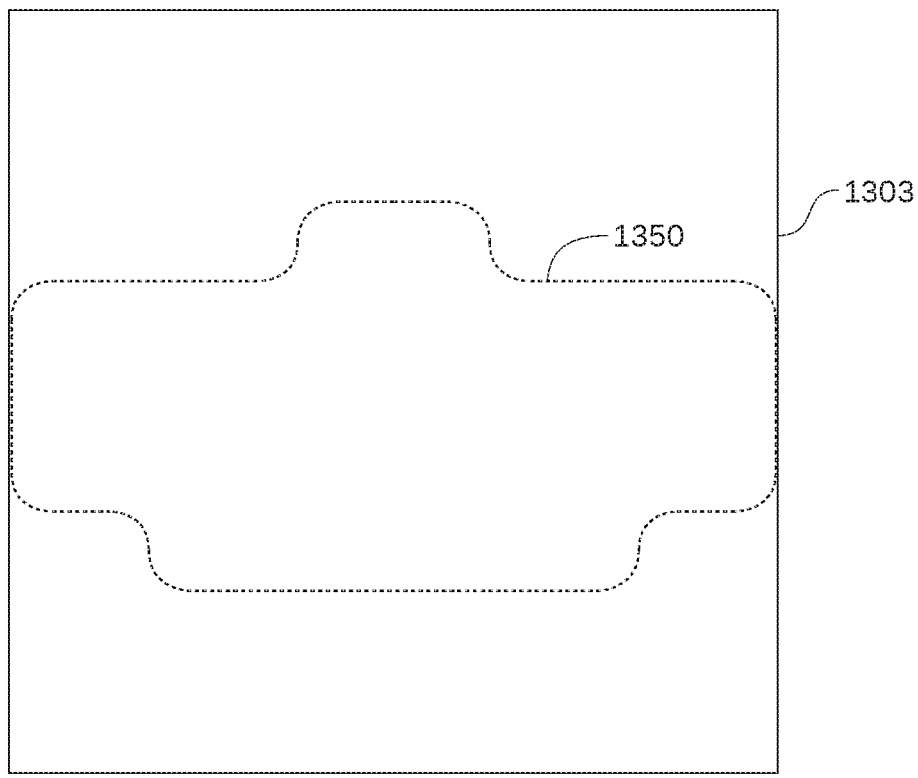
Figure 13D:
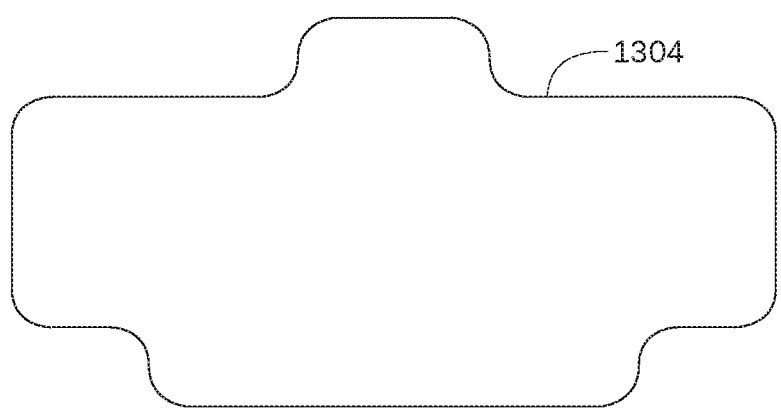

FIG. 13A illustrates a rectangular text-allowed region 1301. For reference, FIG. 13A also illustrates an image outline 1350 of a text-containing image to be incorporated into a digital image. As shown, both text-allowed region 1301 and image outline 1350 have the same aspect ratio, since text-allowed region 1301 and image outline 1350 each have a same height h and a same width w. FIG. 13B illustrates an oval text-allowed region 1302 and image outline 1350 of a text-containing image. As shown, both text-allowed region 1302 and image outline 1350 have a same height h and a same width w, and therefore the same aspect ratio. FIG. 13C illustrates a square text-allowed region 1303 and image outline 1350. FIG. 13D illustrates a text-allowed region 1304 that is substantially the same shape as image outline 1350 of a text-containing image. Thus, in addition to being a circle, oval, or polygon, according some embodiments, a text-allowed region can have an irregular shape, such as the shape of image outline 1350.

Returning to FIG. 11, in step 1107, text-locating application 1031 performs contrast analysis between a text-containing image and a text-allowed region in the digital image received in step 1101. For example, contrast analysis application 1036 may be employed in step 1107. Contrast analysis application 1036 is configured to generate a numeric value for each of the one or more text-allowed regions sized and located in step 1106. For each text-allowed region, the numeric value is based on at least the color contrast between pixels of the text-containing image and pixels of the text-allowed region. For example, in some embodiments, for a particular text-allowed region, such color contrast is determined based on a distance in color space between pixels in the text-containing image and pixels in the particular text-allowed region. In some embodiments, the color contrast is analyzed between the overall color palette of all pixels of the text-containing image and the overall color palette of all pixels of the text-allowed region. Alternatively, in some embodiments, the color contrast is analyzed between a portion of the pixels of the text-containing image (for example, edge pixels) and a portion of the pixels of the text-allowed region (for example, pixels within the text-allowed region that are adjacent to the text-containing image when the text-containing image is located within the text-allowed region).

In step 1108, text-locating application 1031 selects a particular text-allowed region of the one or more text-allowed regions sized and located in step 1106. Text-locating application 1031 selects the particular text-allowed region based at least in part on the numeric values determined in step 1107. In some embodiments, text-locating application 1031 selects the particular text-allowed region further based on one or more additional factors, including the area of each text-allowed region, the proximity of each text-allowed region with respect to bounding shapes, visually interesting subject matter, reserved regions, and the like. In such embodiments, each such factor may be weighted differently. For example, the color contrast analysis, which quantifies how much visible contrast a particular text-allowed region has with the text-containing image, may be weighted more heavily than other factors, such as size of each text-allowed region.

In some embodiments, the numeric value determined for each text-allowed region in step 1107 may also be employed as a confidence value associated with the text-allowed region. The confidence value quantifies the likelihood that the associated text-allowed region selected in step 1108 can be readily seen by a viewer and does not obscure or overlap visually interesting subject matter in the digital image. In such embodiments, when the confidence value of the text-allowed region selected in step 1108 is less than a particular threshold value, the text-containing image for which the text-allowed is selected is flagged for manual review. Thus, for a text-containing image that cannot be incorporated into a digital image in a satisfactory text-allowed location, manual review by a user can be employed to determine a solution, such as modification of the digital image, the text-containing image, or both.

In step 1109, text-locating application 1031 modifies the digital image received in step 1101 by incorporating the text-containing image into the digital image. Specifically, text-locating application 1031 replaces the text-allowed region selected in step 1108 with the text-containing image. Alternatively, in embodiments in which the text-containing image does not have the identical shape as the selected text-allowed region, text-locating application 1031 positions the text-containing image within the selected text-allowed region, and replacing pixels of the selected text-allowed region with corresponding pixels of the text-containing image.

In sum, a text-containing image is incorporated into a digital image in a location that does not obscure or overlap one or more proscribed areas in the digital image. One or more text-allowed regions of the digital image are determined based on the location of human faces and edges detected in the digital image that indicate visually interesting subject matter, as well as on the location of other proscribed regions of the digital image. The most suitable text-allowed region is selected based on color contrast between pixels of the text-containing image and pixels of each text-allowed region. The digital image is then modified by incorporating the text-containing image in the location of the most suitable text-allowed region.

At least one advantage of the disclosed techniques is that text-containing images can be incorporated into digital images in a way that is more robust and reliable than when incorporated as part of a manual process. For example, sub-optimal placement of a title treatment image in a digital image due to poor contrast with the region of the digital image in which the title treatment is positioned can be avoided. Further, many variations of a text-containing image, such as different localizations of a title treatment, can be incorporated into a digital image in an automated and easily scalable fashion.

1. In some embodiments, a computer-implemented method comprises: analyzing a digital image to determine one or more text-allowed regions included in the digital image, for each of the one or more text-allowed regions, computing a numeric value based on a color contrast between pixels of a text-containing image and pixels of the text-allowed region, wherein the text-containing image is to be incorporated into one of the text-allowed regions included in the digital image, selecting a first text-allowed region based at least in part on the numeric value computed for each text-allowed region, and incorporating the text-containing image into the first text-allowed region included in the digital image.

2. The method of clause 1, further comprising determining that the digital image does not include any text prior to analyzing the digital image to determine the one or more text-allowed regions.

3. The method of clause 1 or 2, wherein each of the one or more text-allowed regions comprises a region of the digital image that does not overlap a proscribed portion of the digital image.

4. The method of any of clauses 1-3, wherein the proscribed portion of the digital image comprises at least one of a visually interesting region included in the digital image and a previously-defined reserved portion of the digital image, 5. The method of any of clauses 1-4, wherein the reserved portion of the digital image comprises a portion of the digital image reserved for another text-containing image.

6. The method of any of clauses 1-5, wherein the visually interesting region includes one or more edge pixels determined via one or more edge detection operations performed on the digital image.

7. The method of any of clauses 1-6, wherein the visually interesting region comprises a portion of the digital image that includes a detected face.

8. The method of any of clauses 1-7, wherein, for each of the one or more text-allowed regions, the color contrast is determined by computing a distance in color space between pixels in the text-containing image and pixels in the text-allowed region.

9. The method of any of clauses 1-8, wherein the distance in color space is based on a color palette associated with the text-containing image and a color palette associated with the text-allowed region.

10. In some embodiments, a non-transitory computer-readable storage medium including instructions that, when executed by a processor, cause the processor to perform the steps of: receiving a request to translate an element of source text from an origin language, performing one or more edge detection operations on the digital image to detect one or more edge pixels included in the digital image, determining a negative space region included in the digital image that does not include any edge pixels and has a same aspect ratio as the text-containing image, defining at least one text-allowed region within the negative space region, for each of the one or more text-allowed regions, computing a numeric value based on a color contrast between pixels of a text-containing image and pixels of the text-allowed region, wherein the text-containing image is to be incorporated into one of the text-allowed regions included in the digital image, selecting a first text-allowed region based at least in part on the numeric value computed for each text-allowed region, and incorporating the text-containing image into the first text-allowed region included in the digital image.

11. The non-transitory computer-readable storage medium of clause 10, wherein the at least one text-allowed region has an area that is greater than a minimum threshold value.

12. The non-transitory computer-readable storage medium of any of clauses 10 or 11, wherein the minimum threshold value is based on an area of the text-containing image.

13. The non-transitory computer-readable storage medium of any of clauses 10-12, further comprising performing one or more blurring operations on the digital image prior to performing the one or more edge detection operations on the digital image.

14. The non-transitory computer-readable storage medium of any of clauses 10-13, wherein the numeric value computed for each of the one or more text-allowed regions is further based on proximity of the one or more edge pixels included in the digital image to a proscribed portion of the digital image.

15. The non-transitory computer-readable storage medium of any of clauses 10-14, further comprising determining that the digital image does not include any text prior to analyzing the digital image to determine the one or more text-allowed regions.

16. The non-transitory computer-readable storage medium of any of clauses 10-15, wherein each of the one or more text-allowed regions comprises a region of the digital image that does not overlap a proscribed portion of the digital image.

17. The non-transitory computer-readable storage medium of any of clauses 10-16, wherein the proscribed portion of the digital image comprises at least one of a visually interesting region included in the digital image and a previously-defined reserved portion of the digital image, 18. The non-transitory computer-readable storage medium of any of clauses 10-17, wherein the reserved portion of the digital image comprises a portion of the digital image reserved for another text-containing image.

19. In some embodiments, a system comprises: a memory storing a text-locating application, and a processor that is coupled to the memory and, when executing the text-locating application, is configured to: analyze a digital image to determine one or more text-allowed regions included in the digital image, for each of the one or more text-allowed regions, compute a numeric value based on a color contrast between pixels of a text-containing image and pixels of the text-allowed region, wherein the text-containing image is to be incorporated into one of the text-allowed regions included in the digital image, select a first text-allowed region based at least in part on the numeric value computed for each text-allowed region, and incorporate the text-containing image into the first text-allowed region included in the digital image, wherein each of the one or more text-allowed regions comprises a region of the digital image that does not overlap a proscribed portion of the digital image.

20. The system of clause 19, wherein analyzing the digital image to determine the one or more text-allowed regions comprises: performing one or more edge detection operations on the digital image to detect one or more edge pixels included in the digital image, determining a negative space region included in the digital image that does not include any edge pixels and has a same aspect ratio as the text-containing image, and defining at least one text-allowed region within the negative space region.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to various embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of application data, content servers, and client devices, persons skilled in the art will appreciate that the systems and techniques described herein are applicable to other types of application data, content servers, and client devices. The foregoing description and drawings are, accordingly, to be regarded in an illustrative rather than a restrictive sense.

What is claimed is:

1. A computer-implemented method, comprising:
analyzing a digital image to determine one or more text-allowed regions included in the digital image for a text-containing image, wherein the text-containing image has a first aspect ratio and a first shape, and the one or more text-allowed regions include a first text-allowed region having an aspect ratio equal to the first aspect ratio and a shape that is not equal to the first shape;
for each of the one or more text-allowed regions, computing a numeric value based on a color contrast between pixels of the text-containing image and pixels of the text-allowed region;
selecting the first text-allowed region based at least in part on the numeric value computed for each text-allowed region; and
incorporating the text-containing image into the first text-allowed region included in the digital image.

2. The method of claim 1, further comprising determining that the digital image does not include any text prior to analyzing the digital image to determine the one or more text-allowed regions.

3. The method of claim 1, wherein each of the one or more text-allowed regions comprises a region of the digital image that does not overlap a proscribed portion of the digital image.

4. The method of claim 3, wherein the proscribed portion of the digital image comprises at least one of a visually interesting region included in the digital image and a previously-defined reserved portion of the digital image.

5. The method of claim 4, wherein the reserved portion of the digital image comprises a portion of the digital image reserved for another text-containing image.

6. The method of claim 4, wherein the visually interesting region includes one or more edge pixels determined via one or more edge detection operations performed on the digital image.

7. The method of claim 4, wherein the visually interesting region comprises a portion of the digital image that includes a detected face.

8. The method of claim 1, wherein, for each of the one or more text-allowed regions, the color contrast is determined by computing a distance in color space between pixels in the text-containing image and pixels in the text-allowed region.

9. The method of claim 8, wherein the distance in color space is based on a color palette associated with the text-containing image and a color palette associated with the text-allowed region.

10. The method of claim 1, wherein each of the one or more text-allowed regions has an aspect ratio that is equal to the first aspect ratio of the text-containing image.

11. The method of claim 1, wherein computing the numeric value comprises computing the numeric value based on the color contrast between pixels of the text-containing image and a sub-portion of pixels of the text-allowed region, wherein the sub-portion of pixels comprises pixels of the text-allowed region that are adjacent to the text-containing image when the text-containing image is located within the text-allowed region.

12. The method of claim 1, wherein the one or more text-allowed regions further include a second text-allowed region having an aspect ratio equal to the first aspect ratio and a shape that is not equal to the first shape and is not equal to the shape of the first text-allowed region.

13. The method of claim 1, wherein the first text-allowed region comprises at least one of a circle shape, oval shape, polygon shape, or an irregular shape.

14. A non-transitory computer-readable storage medium including instructions that, when executed by a processor, cause the processor to perform the steps of:
receiving a request to translate an element of source text from an origin language;
performing one or more edge detection operations on a digital image to detect one or more edge pixels included in the digital image;
determining a negative space region included in the digital image that does not include any edge pixels;
defining one or more text-allowed regions within the negative space region for a text-containing image, wherein the text-containing image has a first aspect ratio and a first shape, and the one or more text-allowed regions include a first text-allowed region having an aspect ratio equal to the first aspect ratio and a shape that is not equal to the first shape;
for each of the one or more text-allowed regions, computing a numeric value based on a color contrast between pixels of the text-containing image and pixels of the text-allowed region;
selecting the first text-allowed region based at least in part on the numeric value computed for each text-allowed region; and
incorporating the text-containing image into the first text-allowed region included in the digital image.

15. The non-transitory computer-readable storage medium of claim 14, wherein the at least one text-allowed region has an area that is greater than a minimum threshold value.

16. The non-transitory computer-readable storage medium of claim 15, wherein the minimum threshold value is based on an area of the text-containing image.

17. The non-transitory computer-readable storage medium of claim 14, further comprising performing one or more blurring operations on the digital image prior to performing the one or more edge detection operations on the digital image.

18. The non-transitory computer-readable storage medium of claim 14, wherein the numeric value computed for each of the one or more text-allowed regions is further based on proximity of the one or more edge pixels included in the digital image to a proscribed portion of the digital image.

19. The non-transitory computer-readable storage medium of claim 18, further comprising determining that the digital image does not include any text prior to analyzing the digital image to determine the one or more text-allowed regions.

20. The non-transitory computer-readable storage medium of claim 18, wherein each of the one or more text-allowed regions comprises a region of the digital image that does not overlap a proscribed portion of the digital image.

21. The non-transitory computer-readable storage medium of claim 20, wherein the proscribed portion of the digital image comprises at least one of a visually interesting region included in the digital image and a previously-defined reserved portion of the digital image.

22. The non-transitory computer-readable storage medium of claim 21, wherein the reserved portion of the digital image comprises a portion of the digital image reserved for another text-containing image.

23. A system, comprising:
a memory storing a text-locating application; and
a processor that is coupled to the memory and, when executing the text-locating application, is configured to:
analyze a digital image to determine one or more text-allowed regions included in the digital image for a text-containing image, wherein the text-containing image has a first aspect ratio and a first shape, and the one or more text-allowed regions include a first text-allowed region having an aspect ratio equal to the first aspect ratio and a shape that is not equal to the first shape;
for each of the one or more text-allowed regions, computing a numeric value based on a color contrast between pixels of the text-containing image and pixels of the text-allowed region;
select the first text-allowed region based at least in part on the numeric value computed for each text-allowed region; and incorporate the text-containing image into the first text-allowed region included in the digital image, wherein each of the one or more text-allowed regions comprises a region of the digital image that does not overlap a proscribed portion of the digital image.

24. The system of claim 23, wherein analyzing the digital image to determine the one or more text-allowed regions comprises:

performing one or more edge detection operations on the digital image to detect one or more edge pixels included in the digital image;

determining a negative space region included in the digital image that does not include any edge pixels; and defining at least one text-allowed region within the negative space region.

* * * * *